(12) United States Patent
Merwin et al.

(10) Patent No.: US 11,741,845 B2
(45) Date of Patent: Aug. 29, 2023

(54) IMMERSIVE LANGUAGE LEARNING SYSTEM AND METHOD

(71) Applicants: David Merwin, Columbus, OH (US); Carrie Chen, Cincinnati, OH (US); Susann Moeller, Columbus, OH (US); Xutao Shi, Eagan, MN (US)

(72) Inventors: David Merwin, Columbus, OH (US); Carrie Chen, Cincinnati, OH (US); Susann Moeller, Columbus, OH (US); Xutao Shi, Eagan, MN (US)

( * ) Notice: Subject to any disclaimer, the term of this patent is extended or adjusted under 35 U.S.C. 154(b) by 745 days.

(21) Appl. No.: 16/182,762

(22) Filed: Nov. 7, 2018

(65) Prior Publication Data

US 2019/0311640 A1   Oct. 10, 2019

Related U.S. Application Data

(60) Provisional application No. 62/653,704, filed on Apr. 6, 2018.

(51) Int. Cl.
*G09B 5/06* (2006.01)
*G09B 19/06* (2006.01)
*G06F 3/01* (2006.01)

(52) U.S. Cl.
CPC .............. *G09B 5/06* (2013.01); *G09B 19/06* (2013.01); *G06F 3/011* (2013.01)

(58) Field of Classification Search
CPC ............ G09B 5/06; G09B 19/06; G06F 3/011
See application file for complete search history.

(56) References Cited

U.S. PATENT DOCUMENTS

| | | | | |
|---|---|---|---|---|
| 7,524,191 B2* | 4/2009 | Marmorstein | ........... | G09B 7/00 434/157 |
| 7,817,162 B2* | 10/2010 | Bolick | .................... | G09B 25/02 345/592 |
| 8,740,621 B1* | 6/2014 | Breidner | ................ | G09B 19/04 434/350 |
| 9,058,751 B2* | 6/2015 | Dohring | ................. | G09B 19/04 |
| 9,632,313 B1* | 4/2017 | Madan | ................. | G06Q 10/047 |
| 10,482,177 B2* | 11/2019 | Hahn | ..................... | G06F 40/211 |
| 10,860,100 B2* | 12/2020 | Osterhout | ............... | G06F 3/012 |
| 10,979,672 B1* | 4/2021 | Krol | ........................ | H04N 7/157 |
| 11,610,500 B2* | 3/2023 | Aslan | ..................... | G06Q 50/01 |

(Continued)

OTHER PUBLICATIONS

Vocabulary Stickers, Wayback machine archive, https://web.archive.org/web/20141211003942/http://vocabularystickers.com/, Dec. 11, 2014, 7 pages.

*Primary Examiner* — Xuan M Thai
*Assistant Examiner* — Sadaruz Zaman
(74) *Attorney, Agent, or Firm* — Standley Law Group LLP; Kenny W. Pung; Beverly A. Marsh

(57) ABSTRACT

Exemplary embodiments described herein are directed to systems and methods of immersive language learning that employ positionable visual aids and an associated software application with which the visual aids can interact through scanning by the application. The visual aids may include a word to be learned. The word may be presented in one or more languages. The application is loaded onto a smart phone or other microprocessor-based device with imaging capability. Scanning of the visual aid using the application on the microprocessor-based device results in a presentation by the application that facilitates learning of the word in meaning and pronunciation.

23 Claims, 27 Drawing Sheets

(56) References Cited

U.S. PATENT DOCUMENTS

| | | | |
|---|---|---|---|
| 11,610,507 B2* | 3/2023 | Roche | G09B 23/30 |
| 2003/0208353 A1* | 11/2003 | Ueda | G09B 17/00 |
| | | | 704/4 |
| 2007/0209585 A1* | 9/2007 | Ebensberger | G09B 9/00 |
| | | | 118/682 |
| 2007/0209586 A1* | 9/2007 | Ebensberger | G09B 19/24 |
| | | | 118/682 |
| 2008/0187891 A1* | 8/2008 | Yang | G09B 19/06 |
| | | | 434/156 |
| 2008/0286730 A1* | 11/2008 | Romero, Jr. | G09B 5/06 |
| | | | 345/473 |
| 2008/0300055 A1* | 12/2008 | Lutnick | G07F 17/32 |
| | | | 463/39 |
| 2011/0016173 A1* | 1/2011 | Hoo | G06K 9/00 |
| | | | 709/201 |
| 2011/0029903 A1* | 2/2011 | Schooleman | H04N 13/239 |
| | | | 345/157 |
| 2011/0053123 A1* | 3/2011 | Lonsdale | G09B 5/06 |
| | | | 434/157 |
| 2011/0125502 A1* | 5/2011 | Hadiputro | G09B 19/06 |
| | | | 704/E21.001 |
| 2013/0127980 A1* | 5/2013 | Haddick | G06F 3/013 |
| | | | 348/14.08 |
| 2013/0130211 A1* | 5/2013 | Dohring | G09B 19/06 |
| | | | 434/167 |
| 2013/0177891 A1* | 7/2013 | Hammerschmidt | G09B 5/06 |
| | | | 434/309 |
| 2013/0278631 A1* | 10/2013 | Border | G06Q 30/02 |
| | | | 345/633 |
| 2013/0293577 A1* | 11/2013 | Perez | G02B 27/017 |
| | | | 345/633 |
| 2014/0134576 A1* | 5/2014 | Edge | G09B 19/04 |
| | | | 434/157 |
| 2014/0162224 A1* | 6/2014 | Wallace | G09B 5/06 |
| | | | 434/219 |
| 2015/0206445 A1* | 7/2015 | Modde | G09B 5/06 |
| | | | 434/362 |
| 2015/0268729 A1* | 9/2015 | Cehelnk | H04Q 9/14 |
| | | | 340/870.3 |
| 2016/0267808 A1* | 9/2016 | Agostini | H04N 5/272 |
| 2017/0236447 A1* | 8/2017 | Stalling | G09B 19/08 |
| | | | 434/157 |
| 2018/0039325 A1* | 2/2018 | Delaney | G02B 27/017 |
| 2018/0039330 A1* | 2/2018 | Delaney | G06F 3/011 |
| 2018/0151087 A1* | 5/2018 | Wise | G09B 5/06 |
| 2018/0211560 A1* | 7/2018 | Yakiwchuk | A63F 13/67 |
| 2019/0304406 A1* | 10/2019 | Griswold | G06Q 30/02 |
| 2020/0226823 A1* | 7/2020 | Stachniak | G06T 19/006 |
| 2021/0312887 A1* | 10/2021 | Griswold | G06F 21/6218 |

* cited by examiner

| Kitchen | مطبخ | Dining room | غرفة الطعام |
|---|---|---|---|
| table | الطاولة - المنضدة | refrigerator | ثلاجة |
| sink | مغسلة | microwave | ميكروويف |
| stove | موقد طبخ | oven | فرن |
| dishwasher | غسالة صحون | blender | خلاط |
| cup | كوب | plate | صحن طعام |
| bowl | وعاء | silverware | فضيات |

| | Score Sheet | |
|---|---|---|
| 1 | | correct |
| 2 | | incorrect |
| 3 | | correct |
| 4 | | incorrect |
| 5 | | correct |
| 6 | | correct |
| 7 | | correct |
| 8 | | incorrect |
| 9 | | incorrect |
| 10 | | incorrect |
| 11 | | correct |
| 12 | | incorrect |
| 13 | | correct |
| 14 | | correct |
| 15 | | correct |

*FIG. 17*

| Score Sheet | |
|---|---|
| 1 | Correct |
| 2 | Incorrect |
| 3 | Incorrect |
| 4 | Correct |
| 5 | Correct |
| 6 | Correct |
| 7 | Incorrect |
| 8 | Correct |
| 9 | Correct |
| 10 | Correct |
| 11 | Correct |
| 12 | Correct |
| 13 | Correct |
| 14 | Correct |
| 15 | Correct |
| 16 | Correct |
| 17 | Correct |
| 18 | Incorrect |
| 19 | Correct |
| 20 | Correct |

*FIG. 19*

100 points reached! Player receives 1 gold coin from treasure chest

IMMERSIVE LANGUAGE LEARNING SYSTEM AND METHOD

CROSS-REFERENCE TO RELATED APPLICATIONS

This application claims the benefit of U.S. Provisional Application No. 62/653,704, filed on Apr. 6, 2018, which is hereby incorporated by reference as if fully recited herein.

TECHNICAL FIELD

Exemplary embodiments described herein are directed to a system and method of immersive language learning that employs positionable visual aids and an associated software application with which the visual aids can interact.

BACKGROUND

Today, societies are shifting away from traditionally inclusive ethnicities and their associated languages to a more diverse citizenry that may speak and/or understand many different languages. The number of different languages spoken today in the United States is certainly significant.

As a result, there is an increasing need for and/or interest in different languages. Consequently, there is a need for improved mechanisms by which people may learn languages. Systems and methods described herein facilitate the language learning experience.

SUMMARY

Exemplary systems and methods described herein are directed to immersive language learning. Immersive language learning refers to programs by which students learn a target/foreign language via extensive use of said language throughout their daily routine (e.g., throughout an entire school curriculum) rather than in an isolated language course. Exemplary system and method embodiments described herein are directed to virtual immersive language learning where themed visual aids are positioned and/or re-positioned in conjunction with an associated interactive software application. Exemplary system and method embodiments are applicable to any combination of world languages and their respective alphabets/characters.

Exemplary system and method embodiments can be used to facilitate a foreign language (FL) and/or English as a second language (ESL) learning experience where foreigners (refugees, immigrants, international students, etc.) learn the language of their host country by geographic immersion. Exemplary system and method embodiments can also be used to facilitate a foreign learning experience, where users (e.g., English speakers in the US, UK) learn a specific target language within their native language environment through the creation of virtual on-site immersion. Exemplary embodiments with words that appear in a myriad of different language combinations are also possible.

In an exemplary embodiment, the visual aids may be provided, without limitation, in the form of stickers, note cards, or similar devices that may display words, phrases, etc., in the language of interest to the user. Preferably, the visual aids are configured for temporary affixation to objects or other things that are related to the words/phrases displayed on the stickers. For example, a set of stickers relating to typical kitchen items may include stickers that display the words for "kitchen", "oven", "refrigerator", "microwave", etc., in a language(s) of interest. According to an exemplary method, the stickers may be releasably affixed to corresponding objects around a user's kitchen. In this manner, the user is confronted with the words and/or phrases to be learned each time a marked object is encountered, which facilitates learning through association and repetition in actual as opposed to virtual context.

In conjunction with the aforementioned stickers, exemplary system and method embodiments preferably include a software application that is configured to interact with the visual aids—whether stickers or otherwise. Preferably, the application is executable on a microprocessor-based device such as a smart phone or similar mobile device.

Interaction between the application and the visual aids may be facilitated by the inclusion of a mechanism on the visual aids that is readable by the application after imaging by a camera of the device on which the application is being executed, and which causes the application to automatically perform some function or functions. The mechanism may be triggered by one or more symbols or other markings such as, for example, a bar code, QR code, etc., that is readable by the application. Alternatively, the application may be caused to perform some function or functions based upon imaging of the word itself, or based on the overall visual aid in a similar fashion to scanning an augmented reality label.

Regardless of the particular mechanism by which the application is activated, the mechanism generally includes information that instructs the application to execute a function that facilitates and/or enhances the language learning experience. An exemplary application function may be as simple as directing the user to a particular website or webpage, or may be a more complex function such as activating a feature of the application that enhances the learning of a given word by providing an audible pronunciation of the word, presenting the word in one or more phrases, etc. As another option, the application function may be a game having a format that supports the learning process. Of course, it is also possible that initial activation of the application simply provides the user with a choice of various options that are designed to aid the user in the language learning process.

In any case, the unique interaction of the visual aids and the software application in an exemplary system and method embodiment provides an immersive experience that enhances language learning. Other aspects and features of the inventive concept will become apparent to those skilled in the art upon review of the following detailed description of exemplary embodiments along with the accompanying drawing figures.

BRIEF DESCRIPTION OF THE DRAWINGS

With respect to the drawing figures:

FIG. 1 illustrates a collection of exemplary language learning themed visual aids according to an exemplary system and method of the general inventive concept;

FIG. 9 is an exemplary screenshot illustrative of an application function that provides a user with a visual representation of a word or phrase;

FIG. 17 is an exemplary screenshot illustrative of a game mode application function that reports various game results to a user upon completion of an exemplary language learning game;

FIG. 19 is an exemplary screenshot showing a score sheet associated with the geocaching language learning game indicated in FIG. 20;

DETAILED DESCRIPTION OF THE EXEMPLARY EMBODIMENTS

Figure 2:
FIG. 2 depicts an exemplary language learning themed visual aid affixed to an object that corresponds to the word on the visual aid.

Exemplary embodiments described below are directed to novel systems and methods through which a user is provided with an immersive language learning experience. Exemplary systems and methods employ visual aids in combination with a cooperative software application to enhance the ability of a user to learn a language. Specifically, exemplary systems and methods utilize visual aids that interact with a software application running on a processor-based device, which may be a mobile device such as a smartphone. The visual aids may display a code that is readable by the application after imaging by a device camera and which will cause the application to link the imaged visual aid to a verbal clue about the object with which the visual aid has been associated, or vice versa.

According to the exemplary immersive language learning methods described herein, different words and/or phrases of the target language are incorporated in the daily routine by way of visual aids in the form of stickers, small note cards, etc. These visual aids may include, without limitation, representational icons, syllabic stress indicators, and pronunciation indicators. The visual aids may be made available in sets of any language combination and may include themes ranging from furnishings in the home to transportation and ancillary topics as they expand web-like from the theme center. Through temporary affixation of the visual aids to the real objects represented on each visual aid, a user is able to create a virtual immersive environment in which the user is surrounded by a multitude of terms in the target language. In this manner, learning through association and repetition is not only enhanced but also reinforced.

The use of such exemplary visual aids is illustrated in FIG. 1. As previously mentioned, the visual aids may be in the form of note cards or stickers (as shown), which display a particular word. While the term "word" is used for simplicity of illustration, it is to be realized that "word" as used herein is intended to encompass the use of a single word, multiple words, and one or more phrases or sentences that include a given word(s).

An exemplary system may be selected for use in learning or improving a foreign language. For example, the visual aids shown in FIG. 1 are designed to assist a native Arabic speaker in learning English. A multitude of other combinations are, of course, also possible, such that an exemplary system can be adapted to teach any combination of languages.

The visual aids shown in FIG. 1 are in the form of stickers. It should be realized, however, that the visual aids of a given exemplary embodiment may instead be of different form, such as a note card, a note sheet, an electronic visual or audio aid that can be programmed to display different words, or another form that best conveys the content to a user. Visual aids may also be configured to indicate related subject matter (e.g., objects in the same room of a house) among a group of visual aids.

Exemplary visual aids may occupy different sorting systems by shape, sound or topics/sub-topics, and may be correspondingly color coded, or otherwise coded. Exemplary visual aids may be provided with glow-in-the-dark or other properties. Exemplary visual aids may also correspond and appeal to other senses of a user, including touch (e.g., Braille), taste and smell where applicable. An exemplary visual aid may display language information according to its content/meaning and its own choice of format including graphics or photographs. An exemplary visual aid may display a word/phrase in a single language of choice or a word/phrase paired with its native language equivalent. A user can select a target language and a native language, or any combination of languages choosing a word display with or without translation, audio or visual prompts, or a game mode (see below).

In at least certain exemplary embodiments, the visual aids are adapted for temporary affixation to objects related to the word displayed on the visual aids. For example, the visual aids may include an affixation mechanism in the form of a magnet, an adhesive or another material that enables releasable affixation of the visual aids to the objects. In at least certain embodiments, the visual aid affixation mechanism is reusable so that a given visual aid may be affixed to an object more than once. In other exemplary embodiments, the visual aid affixation mechanism may be omitted. In such an embodiment, a visual aid may simply be rested on an associated object, or a separate affixation mechanism such as a piece of tape, etc., may be attached to a visual aid and used to affix it to an object.

It can be observed in FIG. 1 that the exemplary collection of stickers shown includes groups of stickers displaying words related to different common household locations such as a kitchen and dining room. Within each group of stickers are individual stickers that display the names of objects that typically reside within each of said household locations. For example, the exemplary group of kitchen stickers includes individual stickers that display, among others, words such as "table," "sink," "stove" and "refrigerator." Similarly, the exemplary group of dining room stickers includes individual stickers that display, among others, words such as "plate," "cup" and "silverware."

In using an exemplary sticker set for a given room, a user would releasably affix each sticker (or the stickers of interest) to corresponding objects within or otherwise associated with that room. Typically, the room in which the stickers are placed would be in a location that the user frequents (e.g., their own home, apartment, dorm room). In this manner, the user is confronted with the stickers each time the user is in the room of interest and a marked object is encountered. One example of such sticker affixation is represented in FIG. 2, where a "Microwave" sticker has been affixed to the front of an exemplary microwave.

While not shown in FIG. 2, it should be clear that other stickers of the associated sticker set would be placed on various items within the kitchen to provide an immersive learning experience relative to the words for common kitchen objects and/or activities. As another example, in the context of using an exemplary system and method to learn words related to a bathroom, exemplary visual aids may be configured to display nouns (objects) and words related to said objects such as toothbrush, toothpaste; verbs (actions) such as brush, gargle; adjectives (qualities) such as clean, white; statements such as "I brushed my teeth"; questions such as "did you brush your teeth?"; and/or commands such as "brush your teeth!" Exemplary visual aids may also be configured to display conversational phrases associated with the objects on which the visual aids are intended to be placed, such as "welcome to my home" on a visual aid to be placed on an entry door, or "would you like something to eat?" on a visual aid to be placed on a refrigerator.

Regardless of the particular form or nature of the visual aids provided, an exemplary system and method embodiment also preferably includes a software application that is configured to operate in conjunction with the visual aids to enhance the language learning experience. The goal of the application is to expand the learning experience beyond what is gained only through interaction of a user and a visual aid, whether by providing additional information, furthering the association and repetition process, or otherwise.

Figure 3:
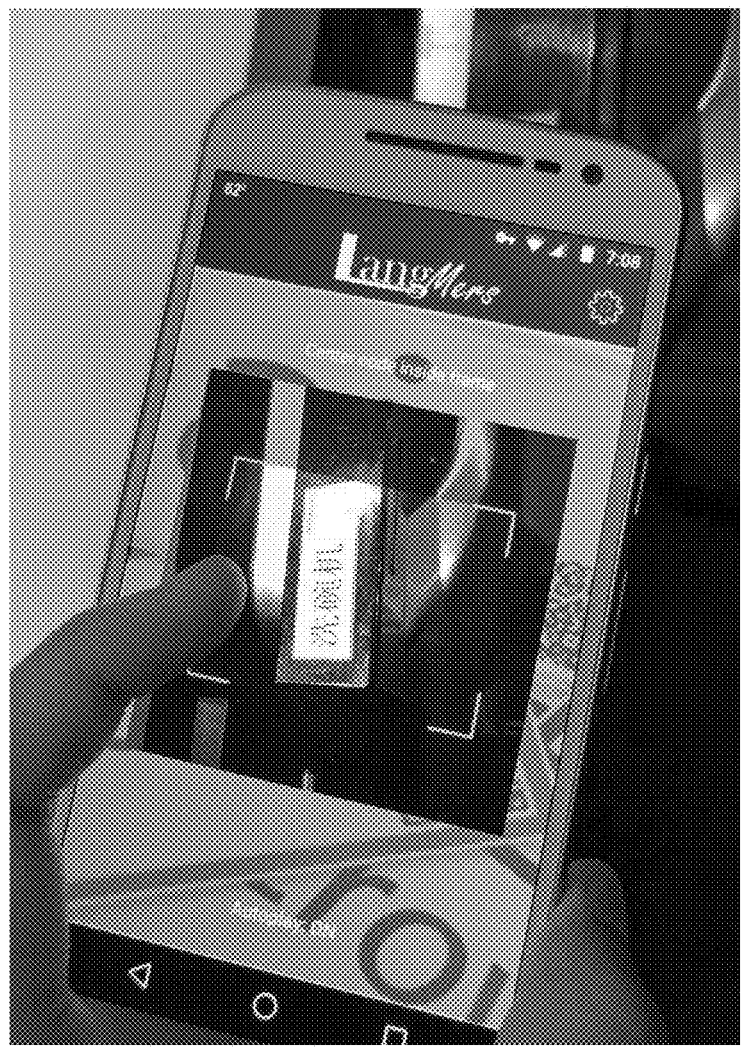
FIG. 3 represents the interaction of an exemplary software application and an exemplary visual aid according to one exemplary system and method of the general inventive concept.

An exemplary application is preferably executed on a smart phone or similar microprocessor-based device for convenience and ease of use. The application takes advantage of the imaging functionality of such devices, which further permits object (e.g., code) recognition and subsequent actions as would be well understood by one of skill in the art. More specifically, interaction between the application and a given visual aid may be initiated by using the application and the device on which the application is running to scan an object on the visual aid. Such an interaction is represented in FIG. 3, for example, where a smart phone running an exemplary application is being used to image a QR code located on an exemplary visual aid in the form of a sticker.

Figure 4:
FIG. 4 is an exemplary screenshot depicting a scanned exemplary visual aid using an exemplary software application running on a smart phone.
Figure 5:
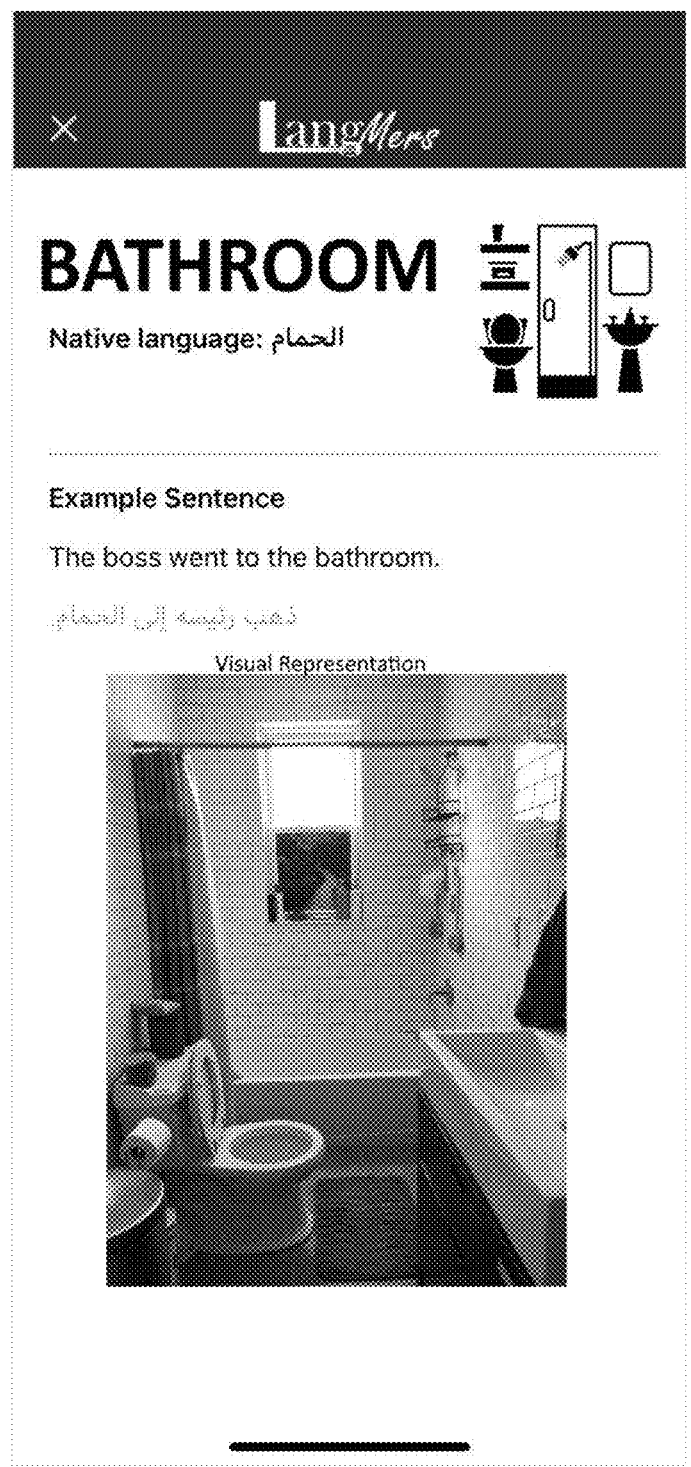
FIG. 5 is another exemplary screenshot that further illustrates operation of the exemplary application to present language learning information relative to the scanned exemplary visual aid of FIG. 4.
Figure 6:
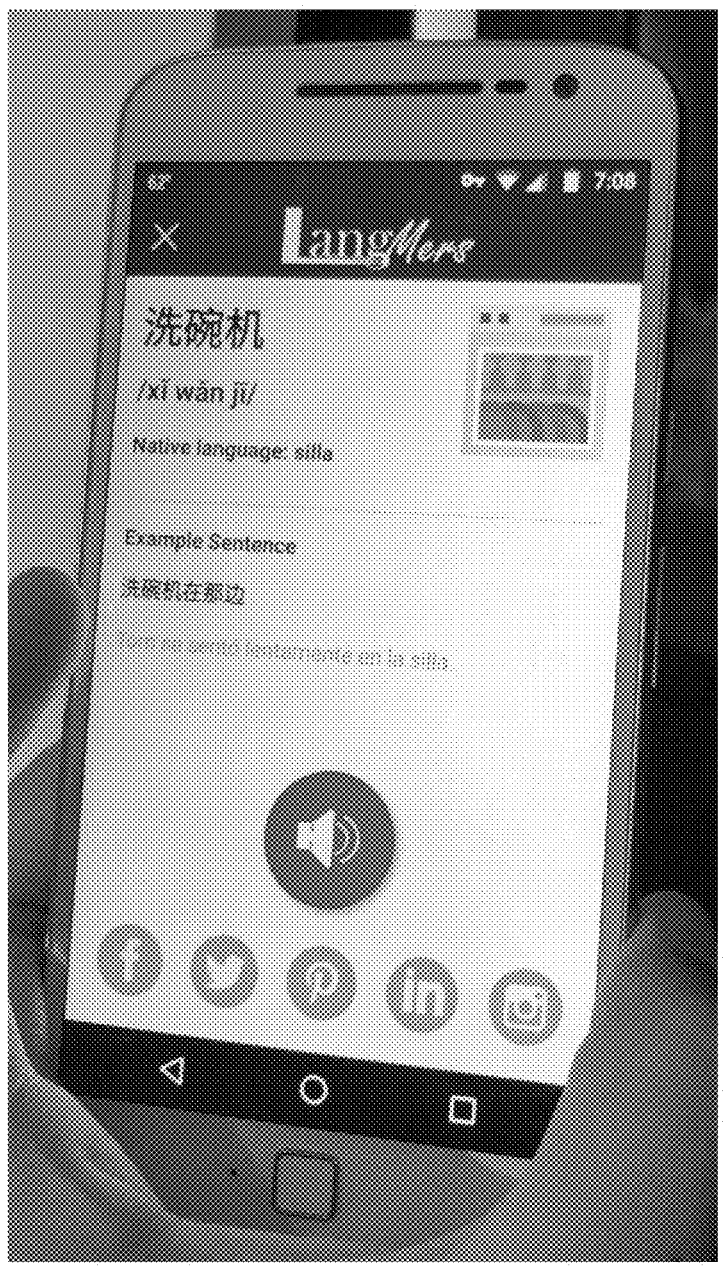
FIG. 6 is an exemplary screenshot that further illustrates operation of an exemplary application running on a smart phone to present language learning information in response to the scanning of another exemplary visual aid.
Figure 7:
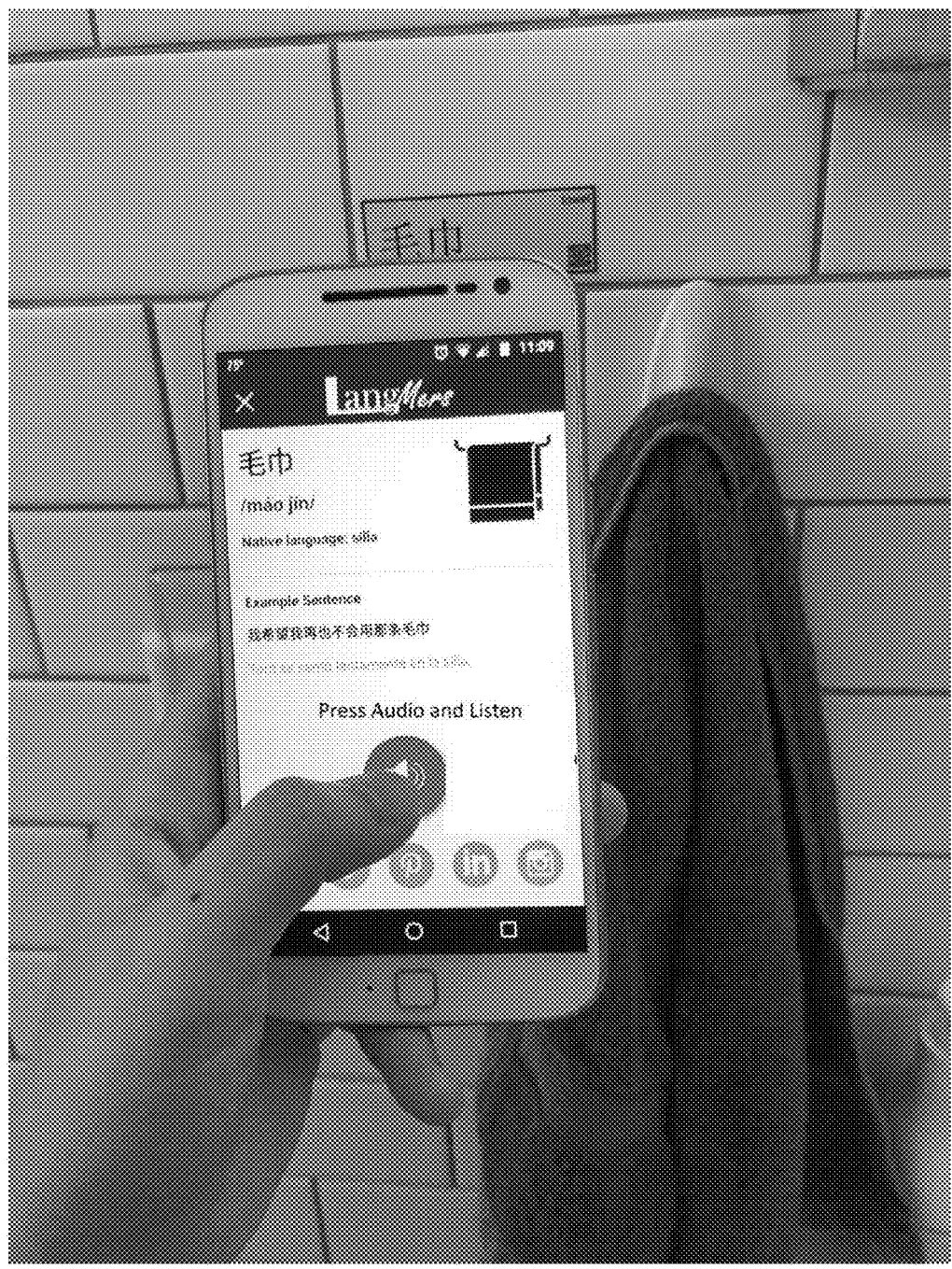
FIG. 7 is an exemplary screenshot illustrative of an immersion mode application function that provides an audible pronunciation of a word or phrase.

Another exemplary sticker in the form of the "Bathroom" sticker is shown affixed to a bathroom wall in FIG. 4. FIG. 5 depicts a related exemplary screenshot that illustrates further operation of the exemplary application to read the QR code and present language learning information in response to scanning visual aid of FIG. 4. In FIG. 5, for example, the word "bathroom" is used in a sentence. FIG. 6 represents a similar action and presentation by an application after the scanning of another exemplary visual aid.

The object to be scanned may be any object known in the art within which readable information may be embedded and from which information, instructions, etc., may be retrieved. Such objects may include, for example and without limitation, one or more symbols or other markings in the aforementioned form of a QR code, and/or in the form of standard bar codes, 3D barcodes, images with data embedded by steganography, etc. Alternatively, an already open application may be caused to perform some function or functions based upon using the device camera to view the overall visual aid, similar to scanning an augmented reality label.

In another exemplary system and method embodiment, the word itself may be scannable and recognizable by an exemplary application instead of a QR code or other object. In a related exemplary embodiment of a visual aid, the visual aid may be provided in the form of a sticker or similar device that is configured so that only the word portion thereof may be peeled off or otherwise removed from the visual aid. This allows the removed portion of the visual aid to be used for scanning of the target word itself (rather than scanning of an object such as a QR code, etc.).

The scannable object(s) on a given visual aid—whether merely a word itself, or a QR code or other specialized object—includes information that instructs the application to execute a function that facilitates and/or enhances the language learning experience. An exemplary application function may be as simple as directing the user to a particular website or webpage, or may be a more complex function such as activating a feature of the application that enhances the learning of a given word by providing an audible pronunciation of the word, presenting the word in one or more phrases, etc (see, e.g., FIGS. 5-7 and 21).

Figure 8:
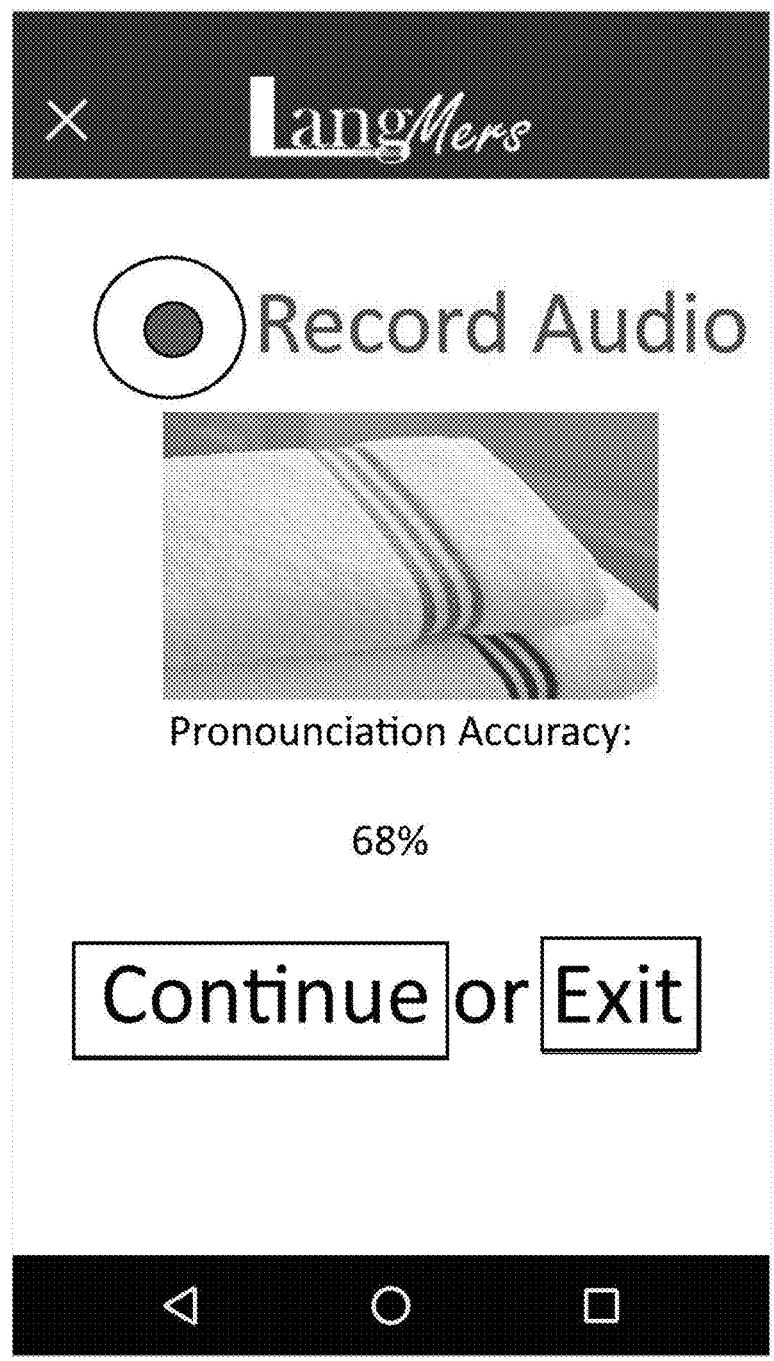
FIG. 8 is an exemplary screenshot illustrative of an application function that provides a user with a visual indication of pronunciation accuracy.
Figure 9:
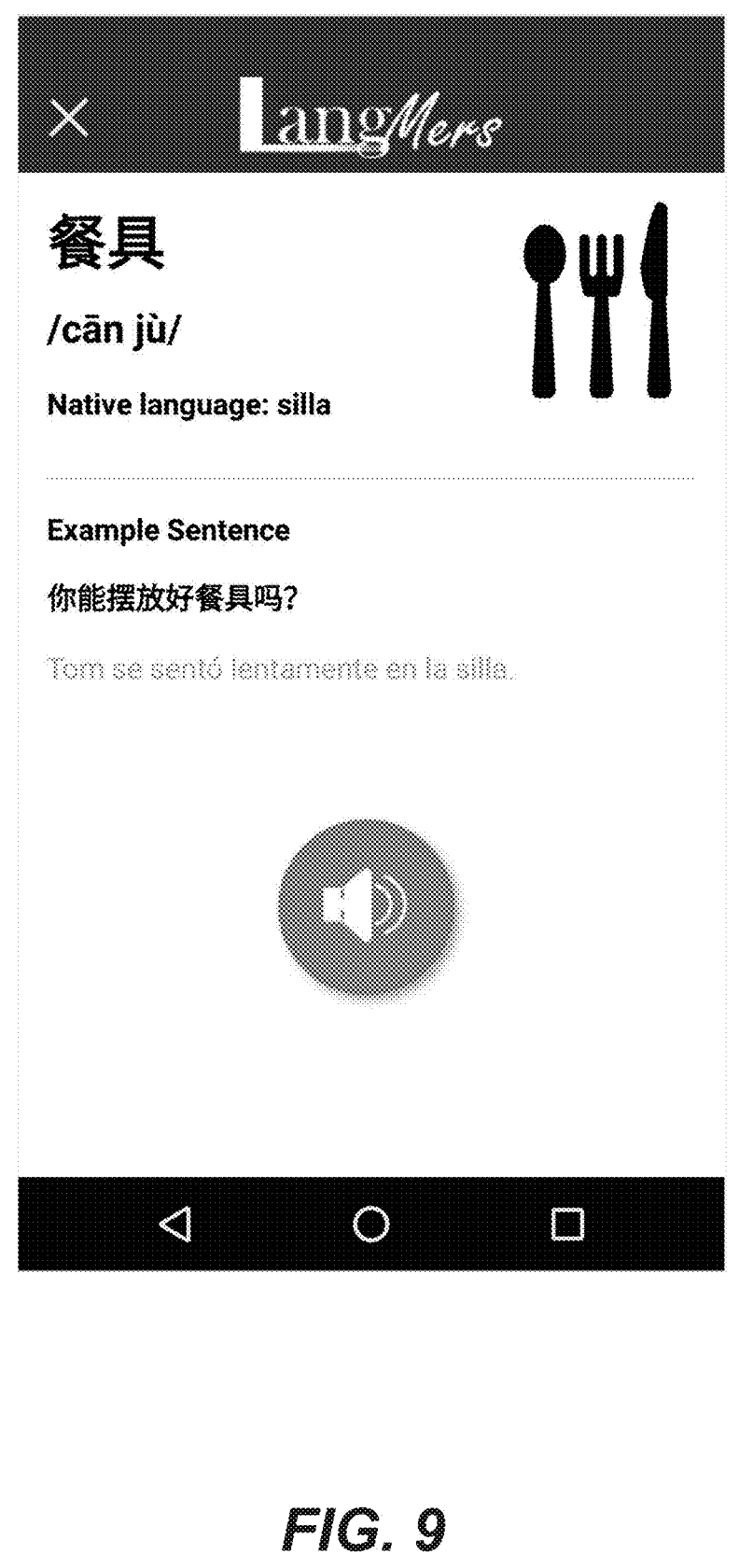

As represented in FIG. 8, an exemplary application may further function to receive a word pronunciation from a user and to provide the user with a visual indication of the pronunciation accuracy. An exemplary application may also provide a user with a visual representation of a word or phrase, as is represented in FIG. 9.

Figure 10:
FIG. 10 is exemplary representation of smart glasses that may be used with an exemplary language learning system.
Figure 11:
FIG. 11 is an exemplary representation of a virtual reality headset that may be used with an exemplary language learning system.
Figure 12A:
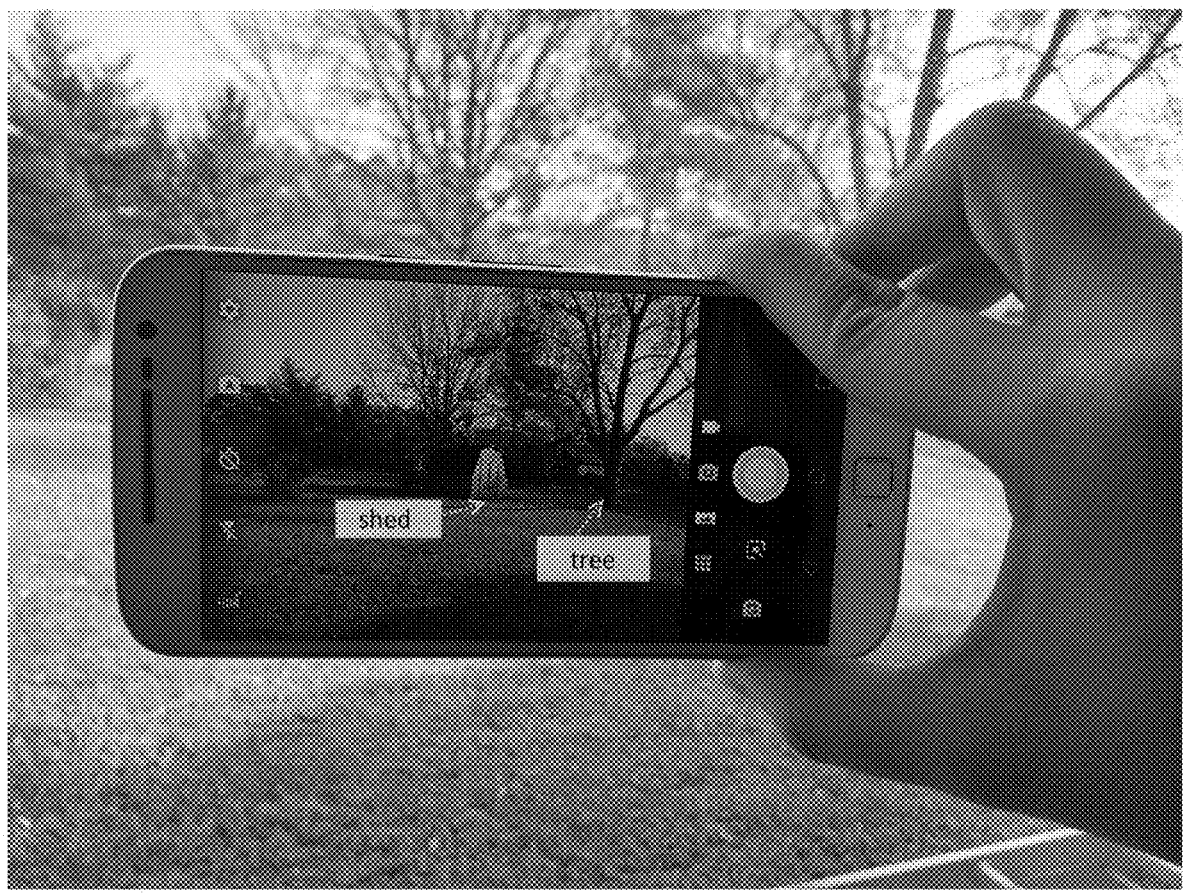
FIGS. 12A-12B represent views associated with an augmented reality feature of an exemplary software application of an exemplary language learning system.
Figure 12B:
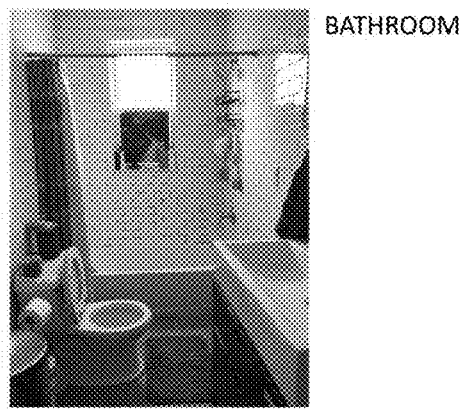

In this context, operation of an exemplary application may even result in reconfiguration of a remote audio source for purposes of providing audible information relating to a word on a visual aid. For example, audio and/or image/video feedback may be relocated to other platforms/operating systems that are capable of audio and/or video output (directly or via signal), such as but not limited to speakers, smart glasses (see FIG. 10), or a virtual reality headset (see FIG. 11). As represented in FIGS. 12A-12B, an exemplary application may further provide a user with various levels of augmented reality functionality.

Figure 13:
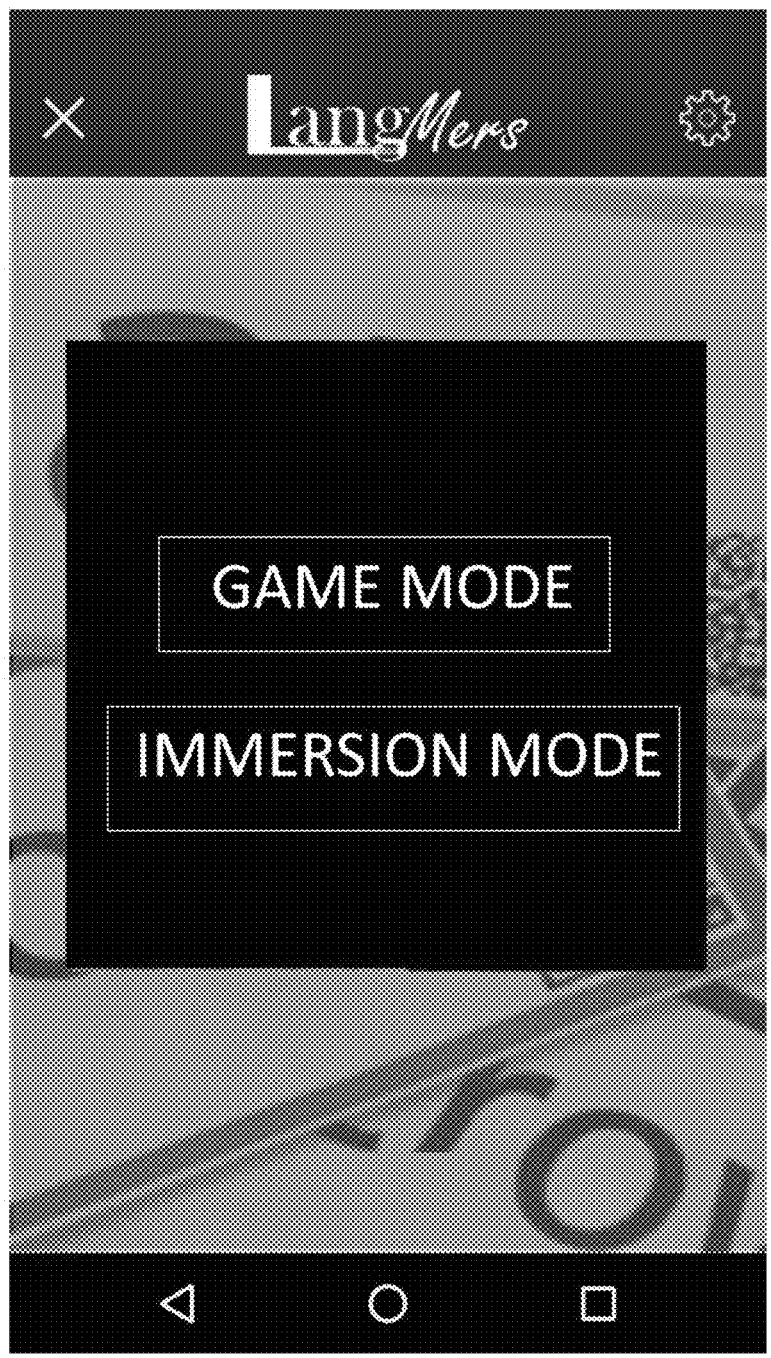
FIG. 13 is an exemplary screenshot illustrative of an application function that allows a user to select between a language immersion mode and a language learning game mode.

As another function, represented generally in FIG. 13, an exemplary application may be operative to provide a user with the choice of learning through an immersion mode or a game mode. Exemplary embodiments of the immersion mode have been largely described above, whereas exemplary embodiments of a game mode are described in more detail below.

Figure 14:
FIG. 14 is an exemplary screenshot illustrative of an application function that provides a user with multiple language learning game modes.

FIG. 14 is an exemplary screenshot intended to illustrate possible language learning game type selection options subsequent to a user electing to learn in game mode. In this example, the user is presented with the option of selecting a "Prompt & Scan" game mode or an "Open SesaMers" game mode, with both Prompt & Scan and Open SesaMers being merely arbitrarily chosen names for purposes of illustration.

Figure 15:
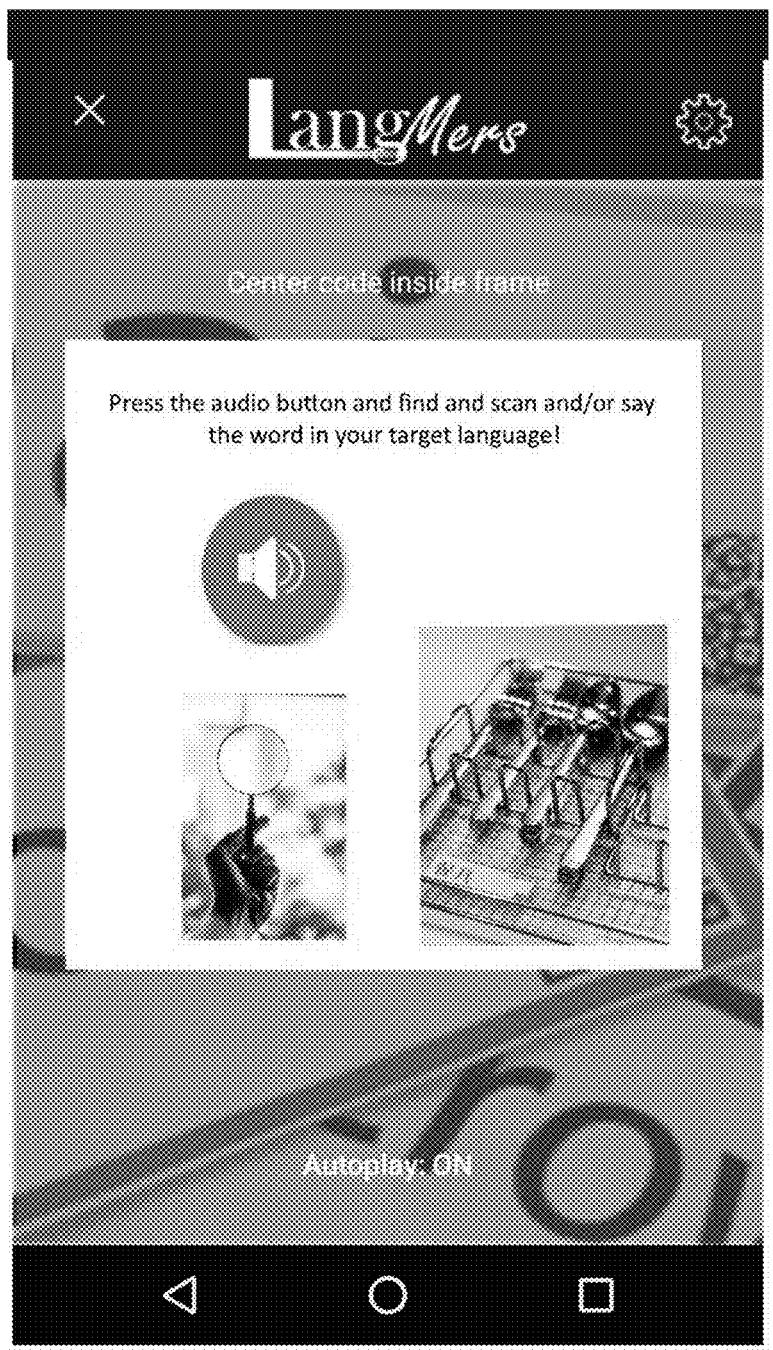
FIG. 15 is an exemplary screenshot illustrative of a game mode application function that allows a user to selectively interact with the application via object scanning or voice input.
Figure 16:
FIG. 16 is an exemplary screenshot illustrative of a game mode application timer function that signals completion of a chosen language learning game and provides associated statistics.

FIGS. 15-17 are exemplary screenshots associated with user selection of the Prompt & Scan game mode option indicated in FIG. 14. According to the Prompt & Scan game mode, after having placed visual aids on various objects at a given location, a user is provided with an audible pronunciation of a word on one of the visual aids and subsequently prompted to scan the visual aid that the user believes displays the spoken word or to speak the word in the target language. This process may be repeated for each of the words in a collection of visual aids. Before playing the game, the user may have the option to review the words on the visual aids using other functionality of the application in a manner described above.

The Prompt & Scan game, as well as other exemplary language learning games according to exemplary system and method embodiments, may include a timer on game play, as indicated in FIG. 15. As represented in FIG. 15 and FIG. 17, an exemplary game may track the correct and incorrect answers (scans) of the user, and may perform other options such as placing incorrectly chosen words on a list for additional subsequent review and/or providing statistics relative to user performance. If not controlled by the user (through scanning or otherwise), the frequency at which each word is presented during the Prompt & Scan game may be controlled by some memory-related model, such as for example, an Ebbinghaus curve.

Figure 18:
FIG. 18 is an exemplary screenshot illustrative of an application function in the nature of a geocaching language learning game.

FIGS. 18 and 19 are associated with the aforementioned Open SesaMers game mode, which may be more technically described as a geolocation/geocaching game. In this exemplary game mode, if a user correctly scans a visual aid in response to being presented with a given word, the application may record the coordinates of the visual aid and the object to which it is affixed. During subsequent plays, the game may then be able to provide clues/cues to a user when a correct object is being approached after the user has been presented with a word and is attempting to scan the corresponding visual aid. For example, the game may inform a user that they are nearing the target word/object.

As another exemplary option or variation of such an exemplary game, the game may be additionally configured to include a timer that is active during different parts of the game process. Still another exemplary option or variation of such an exemplary game may include a pronunciation recognition feature, whereby a user may also choose to, or may be prompted to, repeat the presented word back to the application whereafter the application will rate user pronunciation accuracy. Yet another exemplary option or variation of such an exemplary game may include words corresponding to objects in one specific room of a house during a single game or, in contrast, words corresponding to objects in an entire house may be included in a single game to increase the level of difficulty. Yet other exemplary options or variations may include the provision of hints and/or mapping functions. As with the previously described game, a score sheet (see FIG. 19) or similar reporting of game play results may be provided to the user.

Figure 20:
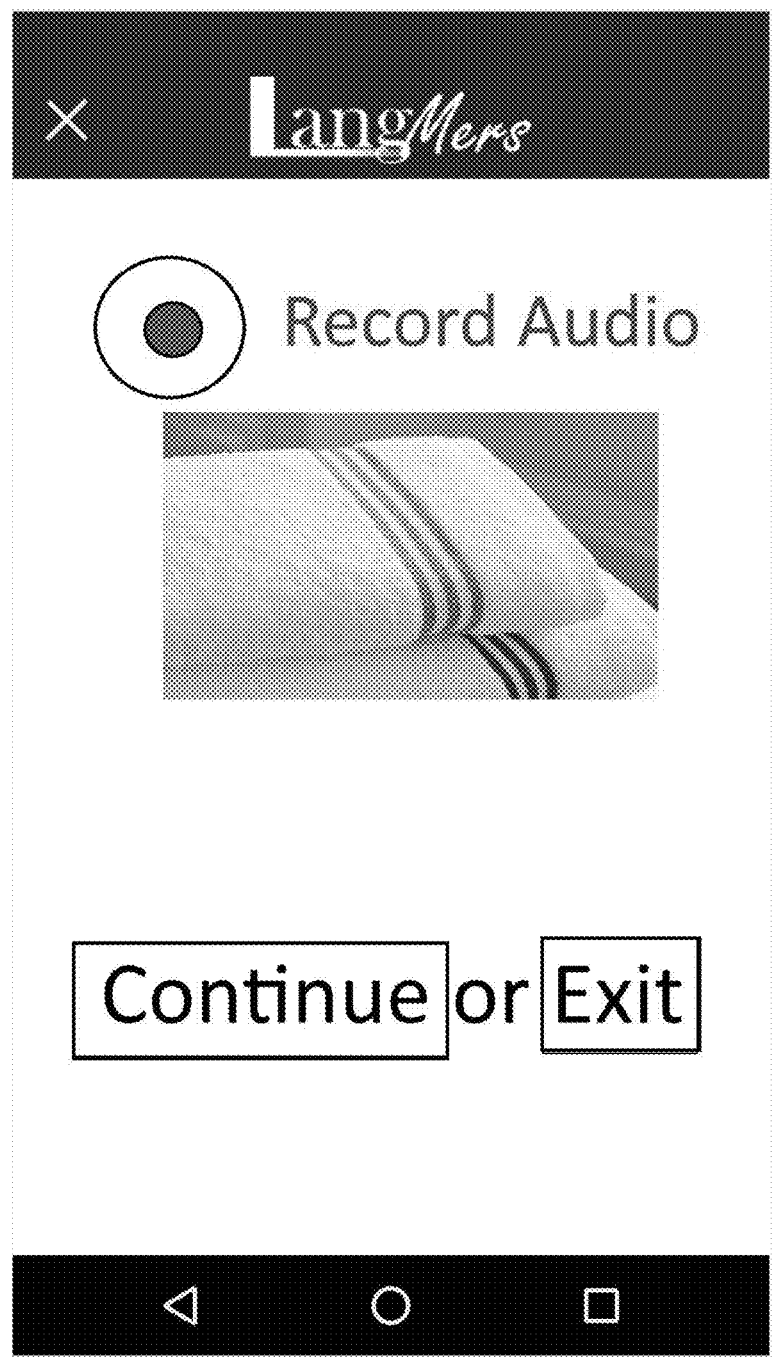
FIG. 20 is an exemplary screenshot illustrative of an application function that allows a user to record his/her pronunciation of a given word or phrase.
Figure 21:
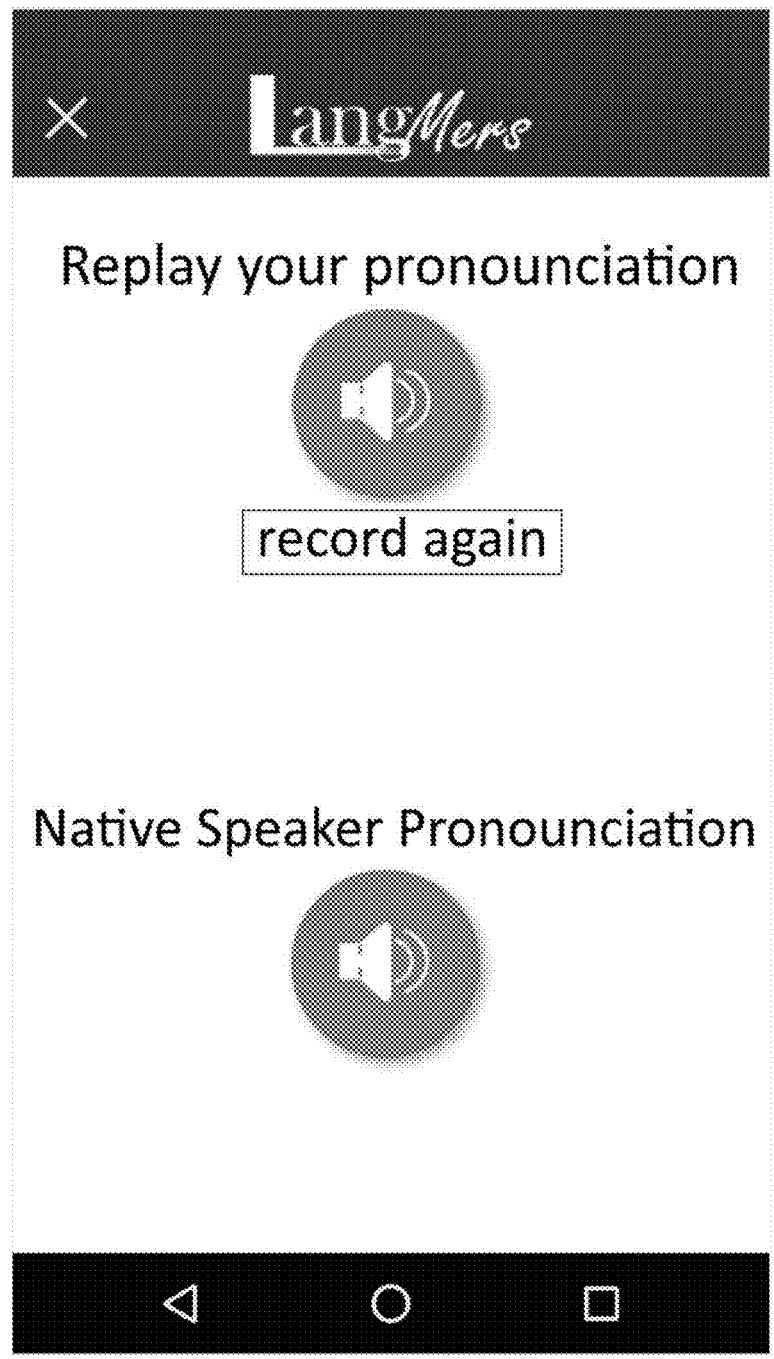
FIG. 21 is an exemplary screenshot illustrative of an application function that allows a user to selectively play back a spoken pronunciation of a given word or phrase previously recorded by the user or listen to the word or phrase spoken by a native speaker of the language being learned.

As represented in FIGS. 20-21, an exemplary application may also be configured to provide learning interaction/feedback by collecting audio input from a user and using the audio input data to improve pronunciation. In this regard, a user may also be provided with the ability to listen to a word or phrase spoken by a native speaker of the target language. An exemplary application may be additionally configured to employ various forms of other visual aids as mnemonic devices to further advance the language learning experience.

Figure 22:
FIG. 22 is an exemplary screenshot illustrative of an application function that allows a user to participate in deeper learning by selecting an object that leads to a series of related objects.

FIG. 22 represents possible additional functionality of an exemplary application that allows a user to experience even more in depth learning relative to a given place, thing or activity. According to this functionality, the user is provided with a selectable representation of an object that, when selected, leads the user to a series of related objects and the words for those objects in the target language. In the example represented in FIG. 22, the selectable object is silverware, which leads to a silverware subset including forks, spoons, knives and other particular types of silverware.

Figure 23:
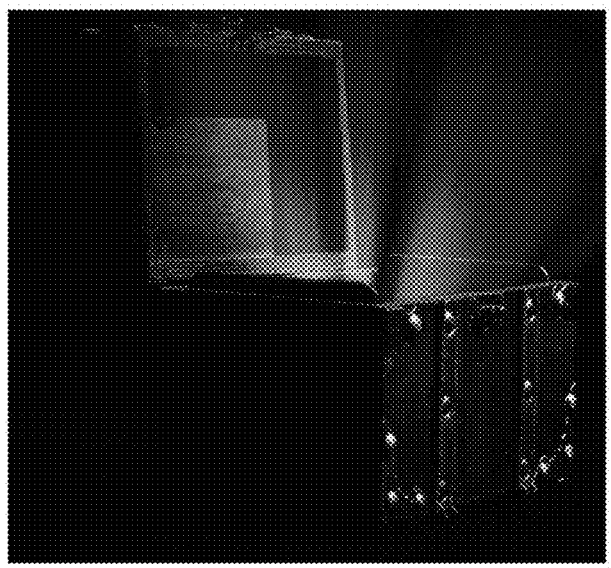
FIG. 23 is an exemplary screenshot illustrative of a game mode application function that rewards a user for game play.
Figure 23:

FIG. 23 represents still further possible application functionality. In this case, a user is rewarded for achieving certain learning goals, whether through the immersion learning mode or the game mode. While the example of FIG. 23 indicates the awarding of a virtual gold coin for reaching 100 points of earning credit, it should be apparent that practically any merit-based system may be employed for the same purpose.

Figure 24:
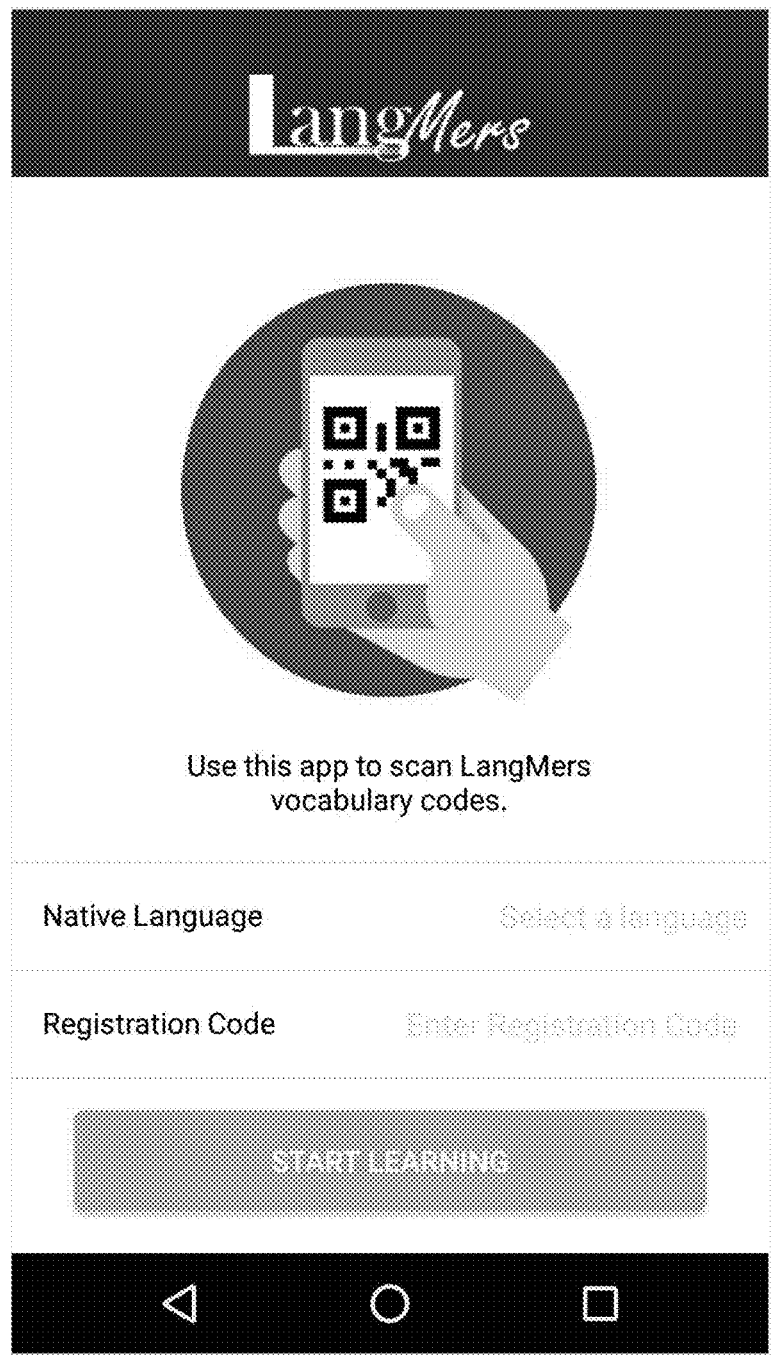
FIGS. 24-25 are exemplary screenshots further illustrating the setting up of an exemplary software application running on a smart phone.
Figure 25:
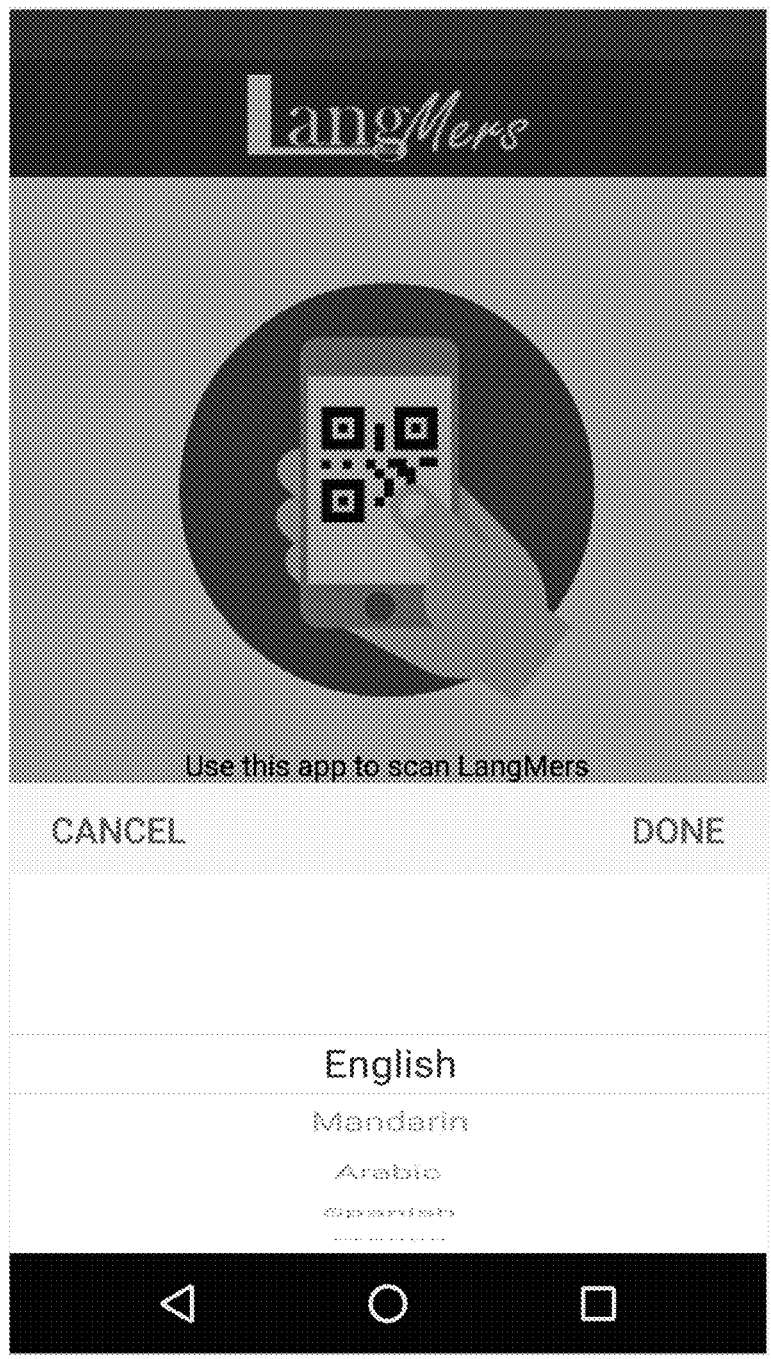

FIGS. 24-25 are exemplary screenshots—illustrating the function of setting up an exemplary application running on a processor-based device such as a smart phone. In this example, a user is prompted to select his/her native language and to enter a provided registration code to unlock the application. FIG. 25 represents a complimentary application screen through which the user is able to select from a multitude of different native languages. Similar application functionality may be used to set up a user account, which may then permit, without limitation, transmitting updates to the user, ordering visual aids, tracking and/or rewarding user performance, etc.

Figure 26A:
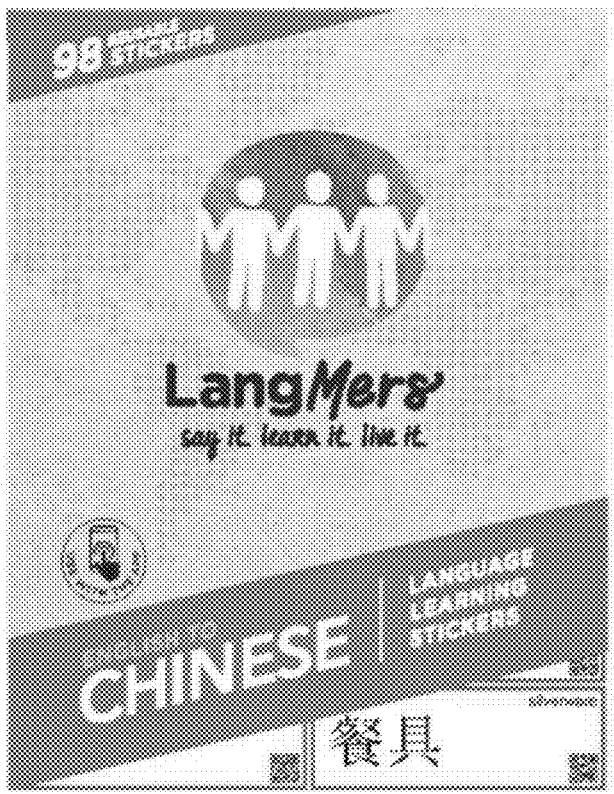
FIGS. 26A-26B illustrate a front and back, respectively, of exemplary packaging that may be used with an exemplary immersive language learning system.
Figure 26B:
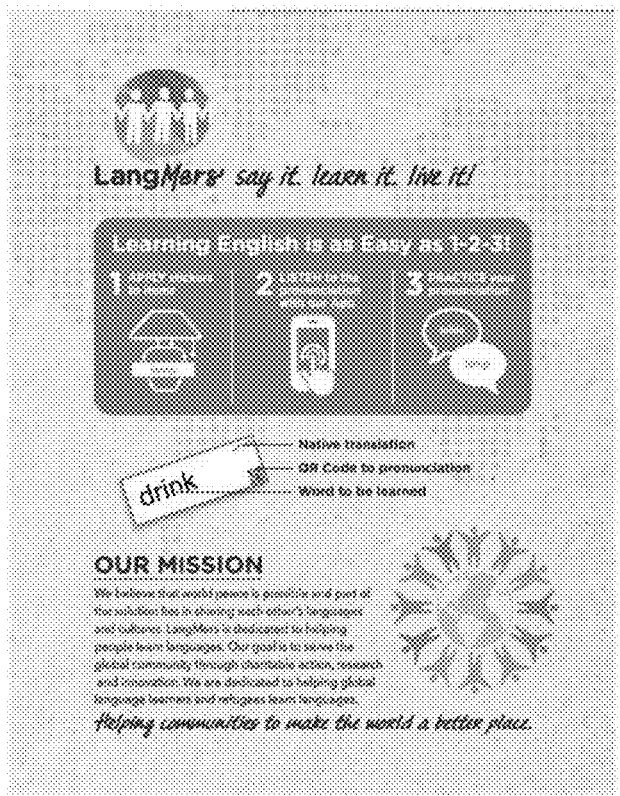

FIGS. 26A-26B illustrate a front and back, respectively, of exemplary packaging that may be used with an exemplary immersive language learning system.

Various exemplary embodiments have been described above for purposes of illustrating the general inventive concept. However, it should be realized that many other variations are also possible. For example, exemplary systems and methods may further include: implementation on a poster or similar printed work, where a word or words may be placed on the poster and scanned using an exemplary application, resulting in any of the application functions described above; implementation in the form of a book (e.g., a text book), magazine, etc., where a word or words may be located in the text of the book/magazine and scanned using an exemplary application, resulting in any of the application functions described above; implementation in a manner whereby scanning of a visual aid using an exemplary application will result in providing the user with an entire audio lesson; a feature whereby an object may be imaged using an application running on a smart phone or similar device and the application will resultantly present a page that will teach the user how to pronounce the name of the object in a given language and/or how to remember name of the object.

Therefore, while certain exemplary embodiments of the general inventive concept are described in detail above, the scope of the general inventive concept is not considered limited by such disclosure, and modifications are possible without departing from the spirit of the general inventive concept as evidenced by the following claims:

What is claimed is:

1. An immersive language learning system configured for use with a microprocessor-based device equipped with an imaging device in an environment that comprises at least one real-world object, the system comprising:
   at least one scannable physical visual aid located proximate a real-world object in the environment, wherein each visual aid displays at least one word in a language to be learned; and
   a software application running on the microprocessor-based device, the software application configured to image at least a portion of a visual aid using the imaging device of the microprocessor-based device and, based on information obtained from the image, to resultantly present a user of the system with information that will facilitate learning of the at least one word on the visual aid;
   wherein the software application is further configured to provide at least one of:
      a prompt and scan game that uses multiple distributed physical visual aids, and wherein a user is provided with an audible pronunciation of a word on one of the visual aids and subsequently prompted to scan the visual aid that the user believes displays the spoken word, and
      a geolocation game that uses multiple distributed physical visual aids that are proximate to different real-world objects, and wherein, if a user correctly scans a visual aid in response to being presented with a given word, the application records the coordinates of the visual aid and the object to which it is proximate to for the purpose of guiding the user to an object or objects during subsequent plays in the geolocation game mode.

2. The immersive language learning system of claim 1, wherein the at least one visual aid is selected from the group consisting of a sticker, a note card, a note sheet, and a programmable electronic device having display functionality.

3. The immersive language learning system of claim 1, wherein the at least one visual aid is configured for releasable attachment to real-world objects of interest.

4. The immersive language learning system of claim 1, wherein the at least one visual aid further displays coding that is readable by the software application and includes instructions that will cause the application to execute a subsequent function, the coding selected from the group consisting of a QR code, a standard bar code, a 3D barcode, and an image with data embedded by steganography.

5. The immersive language learning system of claim 1, wherein the at least one visual aid further displays information selected from the group consisting of the at least one word presented in a language other than the language to be learned, a phrase or sentence that includes the at least one word, representational icons, syllabic stress indicators, pronunciation indicators, graphics, photographs, and combinations thereof.

6. The immersive language learning system of claim 1, wherein the at least one visual aid further includes a non-visual sensory trigger selected from the group consisting of texture, scent and flavor.

7. The immersive language learning system of claim 1, wherein the at least one visual aid is a part of a themed set of visual aids.

8. The immersive language learning system of claim 1, wherein the microprocessor-based device is a smart phone or tablet.

9. The immersive language learning system of claim 1, wherein the software application is further configured, after imaging of at least a portion of the at least one visual aid, to direct the user to a website or webpage that contains information relative to the at least one word.

10. The immersive language learning system of claim 1, wherein the software application is further configured to present a user with information selected from the group consisting of the at least one word used in a phrase or sentence, an audible pronunciation of the at least one word, a visual representation of the at least one word, and combinations thereof.

11. The immersive language learning system of claim 1, wherein the software application is further configured to provide a user with the choice of learning through an immersion mode.

12. The immersive language learning system of claim 1, wherein the software application is further configured to include a function selected from the group consisting of a timer function that governs game play and a reporting function that reports game play results to the user.

13. The immersive language learning system of claim 1, wherein the software application is further configured to receive audio input from a user in the form of a spoken word and to use the audio input to improve user pronunciation of the spoken word.

14. An immersive language learning system configured for use with a microprocessor-based device equipped with a camera in an environment that comprises at least one real-world object, the system comprising:
   a themed set of scannable physical visual aids, the various visual aids of the set of visual aids displaying different words in a language to be learned and releasably attached to real-world objects in the environment;
   coded information displayed on each visual aid; and
   a software application running on the mobile microprocessor-based device, the software application configured to read the coded information on each of the visual aids through the camera of the microprocessor-based device and, based on instructions included in the coded information, to resultantly present a user of the system with information that will facilitate learning of the words on the visual aids;

wherein the software application is further configured to provide at least one of:
 a prompt and scan game that uses multiple distributed physical visual aids, and wherein a user is provided with an audible pronunciation of a word on one of the visual aids and subsequently prompted to scan the visual aid that the user believes displays the spoken word, and
 a geolocation game that uses multiple distributed physical visual aids that are attached to different associated real-world objects, and wherein, if a user correctly scans a visual aid in response to being presented with a given word, the application records the coordinates of the visual aid and the object to which it is attached to for the purpose of guiding the user to an object or objects during subsequent plays in the geolocation game mode.

15. The immersive language learning system of claim 14, wherein the software application is further configured, upon reading the coded information of a given visual aid, to present a user with information selected from the group consisting of the word presented on the visual aid used in a phrase or sentence, an audible pronunciation of the word presented on the visual aid, a visual representation of the word presented on the visual aid, and combinations thereof.

16. The immersive language learning system of claim 14, wherein the software application is further configured to provide a user with the choice of learning through an immersion mode.

17. The immersive language learning system of claim 14, wherein the software application is further configured to receive audio input from a user in the form of a spoken word and to use the audio input to improve user pronunciation of the spoken word.

18. An immersive language learning method, comprising:
 providing a themed set of scannable physical visual aids, the various visual aids of the set of visual aids displaying different words in a language to be learned, as well as machine readable coded information;
 providing a software application running on a mobile microprocessor-based device, the software application configured to read the coded information on each of the visual aids through a camera of the microprocessor-based device;
 releasably affixing at least one of the visual aids of the set of visual aids to a real-world object;
 reading the coded information on the at least one visual aid using the microprocessor-based device and the software application; and
 based on instructions included in the coded information, resultantly presenting a user with information on the microprocessor-based device that will facilitate learning of the word on the at least one visual aid; and
 providing the user with at least one of:
  a prompt and scan game that uses multiple distributed physical visual aids, provides the user with an audible pronunciation of a word on one of the visual aids, and subsequently prompts the user to scan the visual aid that the user believes displays the spoken word, and
  a geolocation game that uses multiple distributed physical visual aids that are affixed to different associated real-world objects, provides the user with an audible pronunciation of a word on one of the visual aids, and subsequently prompts the user to scan the visual aid that the user believes displays the audibly pronounced word, and wherein when the user correctly scans a visual aid in response to being presented with the audible pronunciation, the application records the coordinates of the visual aid and the real-world object to which it is affixed for the purpose of guiding the user to a real-world object or real-world objects during subsequent plays of the geolocation game.

19. The method of claim 18, wherein the visual aids of the set of visual aids further display information selected from the group consisting of the displayed word presented in a language other than the language to be learned, a phrase or sentence that includes the displayed word, representational icons, syllabic stress indicators, pronunciation indicators, graphics, photographs, and combinations thereof.

20. The method of claim 18, wherein upon reading of the coded information on the at least one visual aid, the microprocessor-based device is directed to a website or webpage that contains information relative to the word displayed on the at least one visual aid.

21. The method of claim 18, wherein upon user initiation, the software application further presents the user with information selected from the group consisting of the word displayed on a given visual aid used in a phrase or sentence, an audible pronunciation of the word displayed on the given visual aid, a visual representation of the word displayed on the given visual aid, and combinations thereof.

22. The method of claim 18, wherein the user is provided by the software application with a choice of learning through an immersion mode.

23. The method of claim 18, wherein the user provides audio input in the form of a spoken word through a microphone of the microprocessor-based device and the software application uses the audio input to train the user on proper pronunciation of the spoken word.

* * * * *